United States Patent
Aweya (10) Patent No.: US 10,505,652 B2
(45) Date of Patent: Dec. 10, 2019

(54) METHODS AND SYSTEMS FOR ESTIMATING OFFSET SKEW AND DRIFT

(71) Applicants: Khalifa University of Science, Technology, and Research, Abu Dhabi (AE); British Telecommunications plc, London (GB); Emirates Telecommunications Corporation, Abu Dhabi (AE)

(72) Inventor: James Aweya, Abu Dhabi (AE)

(73) Assignees: Khalifa University of Science and Technology, Abu Dhabi (AE); British Telecommunications PLC, London (GB); Emirates Telecommunications Corporation, Abu Dhabi (AE)

(*) Notice: Subject to any disclaimer, the term of this patent is extended or adjusted under 35 U.S.C. 154(b) by 0 days.

(21) Appl. No.: 15/858,117

(22) Filed: Dec. 29, 2017

(65) Prior Publication Data

US 2019/0207695 A1    Jul. 4, 2019

(51) Int. Cl.
    *H04J 3/06*   (2006.01)

(52) U.S. Cl.
    CPC .......... *H04J 3/0667* (2013.01); *H04J 3/0676* (2013.01)

(58) Field of Classification Search
    None
    See application file for complete search history.

(56) References Cited

U.S. PATENT DOCUMENTS

| 2009/0276542 A1* | 11/2009 | Aweya | H04J 3/0667 709/248 |
| 2015/0163000 A1* | 6/2015 | Aweya | H04J 3/0602 370/519 |
| 2018/0088625 A1* | 3/2018 | Krithivas | G06F 1/12 |

FOREIGN PATENT DOCUMENTS

| CN | 103888237 B | 4/2017 |
| EP | 0697774 A1 | 8/1994 |
| EP | 3089386 A1 | 4/2015 |
| WO | WO2009132456 A1 | 5/2009 |
| WO | WO2015049479 A1 | 10/2013 |

OTHER PUBLICATIONS

International Search Report and Written Opinion from EPO of International Application No. PCT/EP2017/084837 for Applicant Khalifa University of Science, Technology with an international filed of Dec. 29, 2017.
IEEE 1588-2008 Standard for a Precision Clock Synchronization Protocol for Networked Measurement and Control Systems (2008).
Kalman, R.E. A New Approach to Linear Filtering and Prediction Problems (1960).

* cited by examiner

*Primary Examiner* — Anh Ngoc M Nguyen
(74) *Attorney, Agent, or Firm* — Calfee, Halter & Griswold, LLP (57) ABSTRACT

This invention relates to methods and systems for estimating offset, skew and drift. Embodiments of the invention relate to methods and systems which allow these relationships between a slave clock and a master clock to be estimated based on the exchange of timestamped messages between (Continued)

the master and the slave. Further embodiments of the invention set out uses of these estimates to synchronize a local clock in a slave to a master and to steer the slave clock to stay aligned to the master clock when the master clock is temporarily unavailable or the communication path between slave and master is temporarily unavailable.

24 Claims, 4 Drawing Sheets

METHODS AND SYSTEMS FOR ESTIMATING OFFSET SKEW AND DRIFT

FIELD OF THE INVENTION

The present invention relates to methods and systems for estimating offset, skew and drift. It is particularly, but not exclusively, concerned with methods and systems which allow these relationships between a slave clock and a master clock to be estimated based on the exchange of timestamped messages between the master and the slave.

BACKGROUND OF THE INVENTION

There are a number of factors that can cause two supposedly identical clocks to drift apart or lose synchronization. Other than the need to correct for the time offset between two clocks, there is the need to account or compensate for the effects of oscillator aging and drift. Aging is the systematic change in frequency with time due to internal changes in the oscillator. It is the frequency change with time while factors external to the oscillator (environment, power supply, etc.) are kept constant.

Drift is the systematic change in frequency with time. Drift is due to aging plus changes in the environment and other factors external to the oscillator (drift includes aging). Drift is what one observes in an application (i.e., the particular situation where the oscillator is used). Generally aging, rather than drift, is what one measures during oscillator evaluation and is what one specifies in an oscillator specs or datasheet. In the case of aging, for example, a quartz oscillator changes frequency at an approximately predictable rate, and the resultant deviation over time can be determined.

New high quality ovenized quartz crystal oscillators typically exhibit small, positive frequency drift with time unrelated to external influences (i.e., aging). A significant drop in this aging (frequency change) rate occurs after few weeks of operation at operating temperature. Ultimate aging rate below 0.1 ppb (parts-per-billion) per day are achieved by the highest quality crystals and 1 ppb per day rates are commonplace.

The primary effect of temperature variations is change in the oscillator's frequency. Oven oscillators (e.g., Oven Controlled Crystal Oscillators (OCXOs)) offer the best temperature stability when compared to non-oven crystal oscillators and Temperature Compensated Crystal Oscillators (TCXOs). Non-oven crystal oscillators and TCXOs may drift slowly to a new frequency after the ambient temperature changes since the internal thermal time constant can be fairly long. Though careful oscillator design and manufacturing minimize aging at the time of shipment, aging continues for the life of the oscillator and is affected by the circumstances within the time duration after it is powered off and the storage conditions.

Differences in temperature, the age of the oscillators themselves, material variations in the manufacturing process, contamination, mechanical stress, among other factors, can all affect the quality of synchronization. All of these factors create a need for clock synchronization to allow for two clocks to be aligned when differences occur. The continuous variations of the above factors also explain why the process of synchronization is continuous and not a one-time process. Accurate time (or time-of-day or wall-clock) synchronization now has a wide arrange of applications areas including the electrical utility and smart grids, packet networks, telecom industry, industrial automation, and testing and measurement systems.

Oscillators vary in their ability to maintain an accurate frequency over time. Typically, the more expensive a clock's oscillator, the better the clock's accuracy. Clocks that use cesium or rubidium-based oscillators, for example, can maintain accurate time for long periods after synchronization with a reference time source. Unfortunately, these high-end oscillators are too costly for many applications. Quartz oscillators (ordinary crystal oscillators, TCXOs, OCXOs, etc.), while less expensive, require more frequent synchronization to the reference source to maintain the same accuracy. Many of the environmental effects (on the quartz oscillators) can be minimized by the design of the oscillator and its careful placement in the operating environment. Pressure and humidity effects can be virtually eliminated by sealing the oscillator in a controlled environment (e.g., ovenized enclosure). Most of the remaining effects can be minimized by oscillator placement.

Overview of IEEE 1588v2 PTP

The GrandMaster (GM) is the root timing reference in a domain and transmits synchronization information to the clocks residing in its domain. In IEEE 1588v2 PTP messages are categorized into event and general messages. All IEEE 1588 PTP messages have a common header. Event messages are timed messages in that an accurate timestamp is generated at both transmission and receipt of each message. Event messages have to be accurately timestamped since the accuracy in transmission and receipt timestamps directly affects clock distribution accuracy.

A timestamp event is generated at the time of transmission and reception of any event message. General messages are not required to be timestamped. The set of event messages consists of Sync, Delay_Req, Pdelay_Req, and Pdelay_Resp. The set of general messages consists of Announce, Follow_Up, Delay_Resp, Pdelay_Resp_Follow_Up, Management, and Signaling.

IEEE 1588 PTP allows for two different types of time-stamping methods, either one-step or two-step. One-step clocks update time information within event messages (Sync and Delay-Req) on-the-fly, while two-step clocks convey the precise timestamps of packets in general messages (Follow_Up and Delay-Resp).

The Sync, Delay_Req, Follow_Up, and Delay_Resp messages are used to generate and communicate the timing information needed to synchronize ordinary and boundary clocks (see description below) using the delay request-response mechanism. A Sync message is transmitted by a GM to its slaves and either contains the exact time of its transmission or is followed by a Follow_Up message containing this time. In a two-step ordinary or boundary clock, the Follow_Up message communicates the value of the departure timestamp for a particular Sync message. A Delay_Req message is a request for the receiving node to return the time at which the Delay_Req message was received, using a Delay_Resp message.

Figure 4:
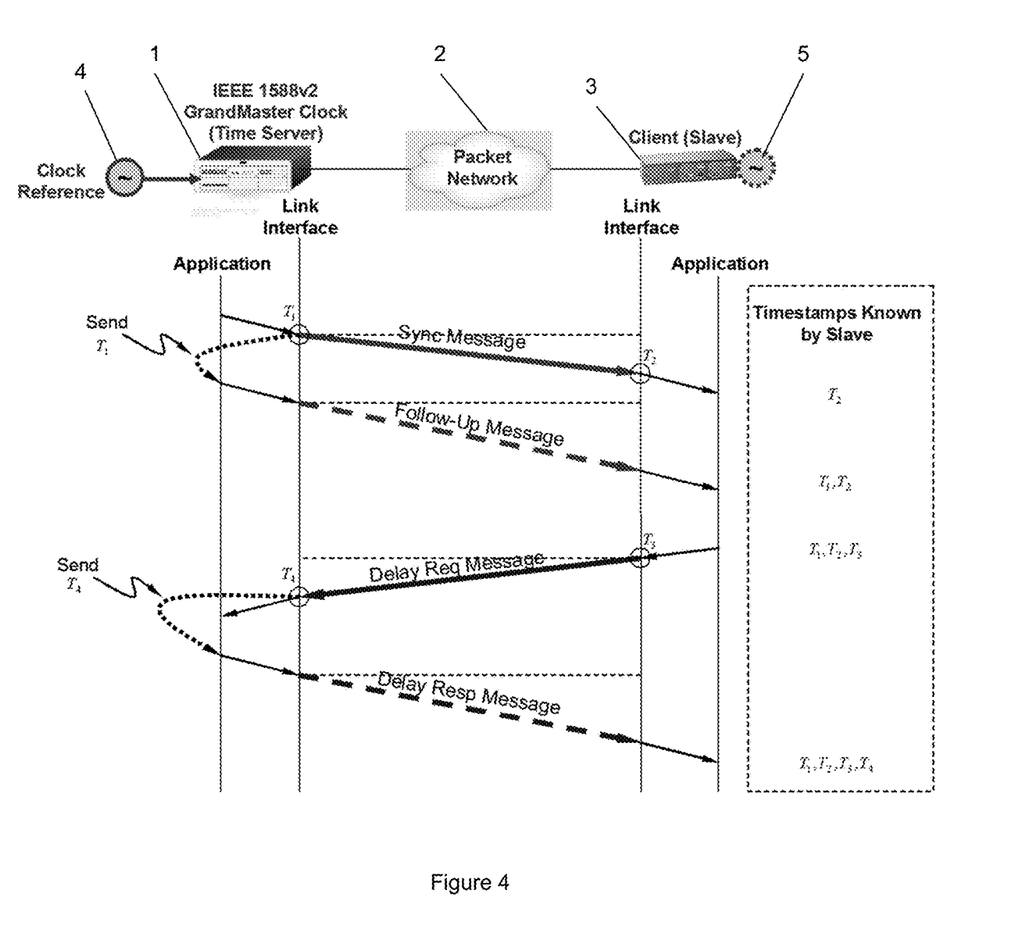
FIG. 4 shows the message flow in a two-step clock process under IEEE 1588 PTP.

The basic pattern of synchronization message exchanges for the two-step clocks is illustrated in FIG. 4. The message exchange pattern for the two-step clock can be explained as follows. The GM 1 sends a Sync message to the slave 3 through a packet network 2 and notes the time $T_1$ at which it was sent according to the reference GM clock 4. The slave receives the Sync message and notes the time of reception $T_2$ according to the local clock 5 in the slave 3.

The GM 1 conveys to the slave the timestamp $T_1$ by one of two ways: 1) Embedding the timestamp $T_1$ in the Sync message (the "one-step clock"). This requires some sort of hardware processing (i.e., hardware timestamping) for highest accuracy and precision. 2) Embedding the timestamp $T_1$ in a Follow_Up message (the "two-step clock" as illustrated in FIG. 4). Next, the slave 3 sends a Delay_Req message to the GM 1 and notes the time $T_3$ at which it was sent according to the slave clock 5. The GM 1 receives the Delay_Req message and notes the time of reception $T_4$ according to the reference clock 4. The GM 1 conveys to the slave 3 the timestamp $T_4$ by embedding it in a Delay_Resp message.

At the end of this PTP message exchange, the slave 3 possesses all four timestamps $\{T_1, T_2, T_3, T_4\}$. These timestamps may be used to compute the offset of the slave's clock 5 with respect to the GM reference clock 4 and the mean propagation time of messages between the two clocks. The computation of offset and propagation time often assumes that the GM-to-slave and slave-to-GM propagation times are equal—i.e. that there is a symmetrical communication path between them.

An object of the present invention is to provide methods and systems for clock synchronization which take account of drift.

A further object of the present invention is to provide a mechanism that characterises the behaviour of a local oscillator in a slave device and uses that to enhance the performance of a clock in the slave device should the reference source become temporarily unavailable.

SUMMARY OF THE INVENTION

An exemplary embodiment of the invention provides a method of estimating the offset, skew and drift of a slave clock in a slave device compared to a master clock in a master device, the method including the steps of: exchanging timing messages between the master device and the slave device and recording the times of sending and receiving said messages; estimating the offset, skew and drift of the slave clock compared to the master clock from said recorded times.

A further exemplary embodiment of the invention provides a slave device connected to a master device over a network, the slave device having: a slave clock; and a controller, wherein: the slave device is arranged to exchange timing messages with the master device and to record the times of sending and receiving said messages and to receive times of sending and receiving said messages from the master device; and the controller is arranged to estimate the offset, skew and drift of the slave clock compared to a master clock in said master device from said recorded times.

A further exemplary embodiment of the invention provides a timing system including a master device and a slave device connected over a network, the master device having a master clock and the slave device having: a slave clock; and a controller, wherein: the slave device and master device are arranged to exchange timing messages with each other and to record the times of sending and receiving said messages; the master device is arranged to send the times of sending and receiving said messages to the master device; and the controller is arranged to estimate the offset, skew and drift of the slave clock compared to a master clock in said master device from said recorded times.

BRIEF DESCRIPTION OF THE DRAWINGS

Embodiments of the invention will now be described by way of example with reference to the accompanying drawings in which.

DETAILED DESCRIPTION

At their broadest, aspects of the present invention provide for methods and systems for estimating the offset, skew and drift of a slave clock in a slave device.

A first aspect of the present invention provides a method of estimating the offset, skew and drift of a slave clock in a slave device compared to a master clock in a master device, the method including the steps of: exchanging timing messages between the master device and the slave device and recording the times of sending and receiving said messages; estimating the offset, skew and drift of the slave clock compared to the master clock from said recorded times.

Estimating the offset, skew and drift of a slave clock allows for good synchronization of the slave clock to the master clock.

Preferably the step of estimating involves using a Kalman filtering approach in which the measurement (or observation) equation contains a term relating to the offset of the slave clock at the time of measurement and the process (or state) equation contains terms relating to the offset, skew and drift of the slave clock at both the current time and the time of the previous measurement.

In certain embodiments the measurement equation used in the Kalman filtering approach is:

$$\underbrace{(T_{1,n} - T_{2,n}) + (T_{4,n} - T_{3,n}) + (r_{f,n} - r_{r,n})}_{y_n} = \underbrace{2\theta_n}_{D_n X_n} + \underbrace{(\gamma_n - \varepsilon_n)}_{v_n}$$

wherein n is a nonnegative time index, $\theta_n$ is the estimated offset at time n, $T_{1,n}$ is the time of sending of a first timing message from master to slave according to the master clock, $T_{2,n}$ is the time of receipt of the first timing message according to the slave clock, $T_{3,n}$ is the time of sending of a second timing message from slave to master according to the slave clock, $T_{4,n}$ is the time of receipt of the second timing message according to the master clock, $r_{f,n}$ is the variable queuing delay between the master and the slave, $r_{r,n}$ is the variable queuing delay between the slave and the master, $D_n=[2\ 0\ 0]$ is a 1×3 matrix, $X_n^T=[\theta_n\ \alpha_n\ \varphi_n]$ is a 3×1 matrix of the estimated offset, skew $\alpha_n$ and drift $\varphi_n$, $\varepsilon_n$ is a stochastic delay in the direction from master to slave, $\gamma_n$ is a stochastic delay in the direction from slave to master, to and $v_n=(\gamma_n-\varepsilon_n)$ is the measurement noise, and the process equation used in the Kalman filtering approach is:

$$X_n = \begin{bmatrix} \theta_n \\ \alpha_n \\ \varphi_n \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \theta_{n-1} \\ \alpha_{n-1} \\ \varphi_{n-1} \end{bmatrix} + \begin{bmatrix} w_{\theta,n} \\ w_{\alpha,n} \\ w_{\varphi,n} \end{bmatrix} = A_n X_{n-1} + w_n,$$

wherein $w_n$ is the process noise vector made up of the process noise in the offset, skew and drift and $\Delta t$ is the time between iterations.

In other embodiments the measurement equation used in the Kalman filtering approach is:

$$\underbrace{(T_{1,n} - T_{2,n}) + (T_{4,n} - T_{3,n}) + (d_f - d_r) + (r_{f,n} - r_{r,n})}_{y_n} = \underbrace{2\theta_n}_{D_n X_n} + \underbrace{(\gamma_n - \varepsilon_n)}_{v_n}$$

wherein n is a nonnegative time index, $\theta_n$ is the estimated offset at time n, $T_{1,n}$ is the time of sending of a first timing message from master to slave according to the master clock, $T_{2,n}$ is the time of receipt of the first timing message according to the slave clock, $T_{3,n}$ is the time of sending of a second timing message from slave to master according to the slave clock, $T_{4,n}$ is the time of receipt of the second timing message according to the master clock, $d_f$ is the fixed delay between the master and the slave, $d_r$ is the fixed delay between the slave and the master, $r_{f,n}$ is the variable queuing delay between the master and the slave, $r_{r,n}$ is the variable queuing delay between the slave and the master, $D_n=[2\ 0\ 0]$ is a 1×3 matrix, $X_n^T=[\theta_n\ \alpha_n\ \varphi_n]$ is a 3×1 matrix of the estimated offset, skew $\alpha_n$ and drift $\varphi_n$, $\varepsilon_n$ is a stochastic delay in the direction from master to slave, $\gamma_n$ is a stochastic delay in the direction from slave to master, and $v_n=(\gamma_n-\varepsilon_n)$ is the measurement noise, and the process equation used in the Kalman filtering approach is:

$$X_n = \begin{bmatrix} \theta_n \\ \alpha_n \\ \varphi_n \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \theta_{n-1} \\ \alpha_{n-1} \\ \varphi_{n-1} \end{bmatrix} + \begin{bmatrix} w_{\theta,n} \\ w_{\alpha,n} \\ w_{\varphi,n} \end{bmatrix} = A_n X_{n-1} + w_n,$$

wherein $w_n$ is the process noise vector made up of the process noise in the offset, skew and drift and $\Delta t$ is the time between iterations.

In any of the above embodiments, it may be chosen that $\Delta t=(T_{2,n}-T_{2,n-1})$, which is the time between receipt of consecutive timing messages at the slave.

The method may further include the step of synchronizing the slave clock to the master clock.

In certain embodiments the method further includes the steps of: determining, in the slave device, between a normal condition in which timing messages are being received from the master device and an abnormal condition in which no timing messages have been received from the master device for at least a predetermined time period; and during said normal condition, storing information about the behavior of the slave clock, the information including information about the skew and drift of the slave clock compared to the master clock, during said abnormal condition, using said stored information to control the slave clock and to synchronize the slave clock as closely as possible to the master clock.

Thus the estimates of the skew and drift obtained during the normal condition can be used to "steer" the slave clock to stay closely aligned to the master clock when the master clock is temporarily unavailable or the communication path between the master and the slave is temporarily broken. For example in a mobile network, a base station can maintain its own accurate time in order to keep operations running even in the event of temporarily losing connection to the timing master.

By storing information about skew and drift, the effects of random noise in the oscillator, the measurement circuitry and any noise in the external reference as well as any aging and environmental effects such as temperature in the oscillator can be captured.

Preferably the stored information also includes information about the offset of the slave clock compared to the master clock. The stored information about the offset may be a low-pass filtered value of the initial offset.

The method of the present aspect may include any combination of some, all or none of the above described preferred and optional features.

The method of the above aspect is preferably implemented by a system according to the second aspect of this invention, as described below, but need not be.

Further aspects of the present invention include computer programs for running on computer systems which carry out the method of the above aspect, including some, all or none of the preferred and optional features of that aspect.

A second aspect of the present invention provides a slave device connected to a master device over a network, the slave device having: a slave clock; and a controller, wherein: the slave device is arranged to exchange timing messages with the master device and to record the times of sending and receiving said messages and to receive times of sending and receiving said messages from the master device; and the controller is arranged to estimate the offset, skew and drift of the slave clock compared to a master clock in said master device from said recorded times.

Estimating the offset, skew and drift of a slave clock allows for good synchronization of the slave clock to the master clock.

Preferably the controller is arranged to estimate the offset, skew and drift of the slave clock using a Kalman filtering approach in which the measurement equation contains a term relating to the offset of the slave clock at the time of measurement and the process equation contains terms relating to the offset, skew and drift of the slave clock at both the current time and the time of the previous measurement.

In certain embodiments the measurement equation used in the Kalman filtering approach is:

$$\underbrace{(T_{1,n} - T_{2,n}) + (T_{4,n} - T_{3,n}) + (r_{f,n} - r_{r,n})}_{y_n} = \underbrace{2\theta_n}_{D_n X_n} + \underbrace{(\gamma_n - \varepsilon_n)}_{v_n}$$

wherein n is a nonnegative time index, $\theta_n$ is the estimated offset at time n, $T_{1,n}$ is the time of sending of a first timing message from master to slave according to the master clock, $T_{2,n}$ is the time of receipt of the first timing message according to the slave clock, $T_{3,n}$ is the time of sending of a second timing message from slave to master according to the slave clock, $T_{4,n}$ is the time of receipt of the second timing message according to the master clock, $r_{f,n}$ is the variable queuing delay between the master and the slave, $r_{r,n}$ is the variable queuing delay between the slave and the master, $D_n=[2\ 0\ 0]$ is a 1×3 matrix, $X_n^T=[\theta_n\ \alpha_n\ \varphi_n]$ is a 3×1 matrix of the estimated offset, skew $\alpha_n$ and drift $\varphi_n$, $\varepsilon_n$ is a stochastic delay in the direction from master to slave, $\gamma_n$ is a stochastic delay in the direction from slave to master, and $v_n=(\gamma_n-\varepsilon_n)$ is the measurement noise, and the process equation used in the Kalman filtering approach is:

$$X_n = \begin{bmatrix} \theta_n \\ \alpha_n \\ \varphi_n \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \theta_{n-1} \\ \alpha_{n-1} \\ \varphi_{n-1} \end{bmatrix} + \begin{bmatrix} w_{\theta,n} \\ w_{\alpha,n} \\ w_{\varphi,n} \end{bmatrix} = A_n X_{n-1} + w_n,$$

wherein $w_n$ is the process noise vector made up of the process noise in the offset, skew and drift and $\Delta t$ is the time between iterations.

In other embodiments the measurement equation used in the Kalman filtering approach is:

$$\underbrace{(T_{1,n} - T_{2,n}) + (T_{4,n} - T_{3,n}) + (d_f - d_r) + (r_{f,n} - r_{r,n})}_{y_n} = \underbrace{2\theta_n}_{D_n X_n} + \underbrace{(\gamma_n - \varepsilon_n)}_{v_n}$$

wherein n is a nonnegative time index, $\theta_n$ is the estimated offset at time n, $T_{1,n}$ is the time of sending of a first timing message from master to slave according to the master clock, $T_{2,n}$ is the time of receipt of the first timing message according to the slave clock, $T_{3,n}$ is the time of sending of a second timing message from slave to master according to the slave clock, $T_{4,n}$ is the time of receipt of the second timing message according to the master clock, $d_f$ is the fixed delay between the master and the slave, $d_r$ is the fixed delay between the slave and the master, $r_{f,n}$ is the variable queuing delay between the master and the slave, $r_{r,n}$ is the variable queuing delay between the slave and the master, $D_n=[2\ 0\ 0]$ is a 1×3 matrix, $X_n^T=[\theta_n\ \alpha_n\ \varphi_n]$ is a 3×1 matrix of the estimated offset, skew $\alpha_n$ and drift $\varphi_n$, $\varepsilon_n$ is a stochastic delay in the direction from master to slave, $\gamma_n$ is a stochastic delay in the direction from slave to master, and $v_n=(\gamma_n-\varepsilon_n)$ is the measurement noise, and the process equation used in the Kalman filtering approach is:

$$X_n = \begin{bmatrix} \theta_n \\ \alpha_n \\ \varphi_n \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \theta_{n-1} \\ \alpha_{n-1} \\ \varphi_{n-1} \end{bmatrix} + \begin{bmatrix} w_{\theta,n} \\ w_{\alpha,n} \\ w_{\varphi,n} \end{bmatrix} = A_n X_{n-1} + w_n,$$

wherein $w_n$ is the process noise vector made up of the process noise in the offset, skew and drift and $\Delta t$ is the time between iterations.

In any of the above embodiments, it may be chosen that $\Delta t=(T_{2,n}-T_{2,n-1})$, which is the time between receipt of consecutive timing messages at the slave.

Preferably the controller is further arranged to synchronize the slave clock to the master clock.

In certain embodiments the controller is further arranged to: determine between a normal condition in which timing messages are being received from the master device and an abnormal condition in which no timing messages have been received from the master device for at least a predetermined time period; and during said normal condition, store information about the behavior of the slave clock, the information including information about the skew and drift of the slave clock compared to the master clock, during said abnormal condition, use said stored information to control the slave clock and to synchronize the slave clock as closely as possible to the master clock.

Thus the estimates of the skew and drift obtained during the normal condition can be used to "steer" the slave clock to stay closely aligned to the master clock when the master clock is temporarily unavailable or the communication path between the master and the slave is temporarily broken. For example in a mobile network, a base station can maintain its own accurate time in order to keep operations running even in the event of temporarily losing connection to the timing master.

By storing information about skew and drift, the effects of random noise in the oscillator, the measurement circuitry and any noise in the external reference as well as any aging and environmental effects such as temperature in the oscillator can be captured.

Preferably the stored information also includes information about the offset of the slave clock compared to the master clock. The stored information about the offset may be a low-pass filtered value of the initial offset.

The slave device of the present aspect may include any combination of some, all or none of the above described preferred and optional features.

A third aspect of the present invention provides a timing system including a master device and a slave device connected over a network, the master device having a master clock and the slave device having:
  a slave clock; and
  a controller, wherein:
    the slave device and master device are arranged to exchange timing messages with each other and to record the times of sending and receiving said messages;
    the master device is arranged to send the times of sending and receiving said messages to the master device; and
    the controller is arranged to estimate the offset, skew and drift of the slave clock compared to a master clock in said master device from said recorded times.

Estimating the offset, skew and drift of a slave clock allows for good synchronization of the slave clock to the master clock.

Preferably the controller is arranged to estimate the offset, skew and drift of the slave clock using a Kalman filtering approach in which the measurement equation contains a term relating to the offset of the slave clock at the time of measurement and the process equation contains terms relating to the offset, skew and drift of the slave clock at both the current time and the time of the previous measurement.

In certain embodiments the measurement equation used in the Kalman filtering approach is:

$$\underbrace{(T_{1,n} - T_{2,n}) + (T_{4,n} - T_{3,n}) + (d_f - d_r) + (r_{f,n} - r_{r,n})}_{y_n} = \underbrace{2\theta_n}_{D_n X_n} + \underbrace{(\gamma_n - \varepsilon_n)}_{v_n}$$

wherein n is a nonnegative time index, $\theta_n$ is the estimated offset at time n, $T_{1,n}$ is the time of sending of a first timing message from master to slave according to the master clock, $T_{2,n}$ is the time of receipt of the first timing message according to the slave clock, $T_{3,n}$ is the time of sending of a second timing message from slave to master according to the slave clock, $T_{4,n}$ is the time of receipt of the second timing message according to the master clock, $r_{f,n}$ is the variable queuing delay between the master and the slave, $r_{r,n}$ is the variable queuing delay between the slave and the master, $D_n=[2\ 0\ 0]$ is a 1×3 matrix, $X_n^T=[\theta_n\ \alpha_n\ \varphi_n]$ is a 3×1 matrix of the estimated offset, skew $\alpha_n$ and drift $\varphi_n$, $\varepsilon_n$ is a stochastic delay in the direction from master to slave, $\gamma_n$ is a stochastic delay in the direction from slave to master, and $v_n=(\gamma_n-\varepsilon_n)$ is the measurement noise, and the process equation used in the Kalman filtering approach is:

$$X_n = \begin{bmatrix} \theta_n \\ \alpha_n \\ \varphi_n \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \theta_{n-1} \\ \alpha_{n-1} \\ \varphi_{n-1} \end{bmatrix} + \begin{bmatrix} w_{\theta,n} \\ w_{\alpha,n} \\ w_{\varphi,n} \end{bmatrix} = A_n X_{n-1} + w_n,$$

wherein $w_n$ is the process noise vector made up of the process noise in the offset, skew and drift and $\Delta t$ is the time between iterations.

In other embodiments the measurement equation used in the Kalman filtering approach is:

$$\underbrace{\frac{(T_{1,n} - T_{2,n}) + (T_{4,n} - T_{3,n}) + (r_{f,n} - r_{r,n})}{2}}_{y_n} = \underbrace{\frac{2\theta_n}{D_n X_n}}_{} + \underbrace{\frac{(\gamma_n - \varepsilon_n)}{v_n}}_{}$$

wherein n is a nonnegative time index, $\theta_n$ is the estimated offset at time n, $T_{1,n}$ is the time of sending of a first timing message from master to slave according to the master clock, $T_{2,n}$ is the time of receipt of the first timing message according to the slave clock, $T_{3,n}$ is the time of sending of a second timing message from slave to master according to the slave clock, $T_{4,n}$ is the time of receipt of the second timing message according to the master clock, $d_f$ is the fixed delay between the master and the slave, $d_r$ is the fixed delay between the slave and the master, $r_{f,n}$ is the variable queuing delay between the master and the slave, $r_{r,n}$ is the variable queuing delay between the slave and the master, $D_n=[2\ 0\ 0]$ is a 1×3 matrix, $X_n^T=[\theta_n\ \alpha_n\ \varphi_n]$ is a 3×1 matrix of the estimated offset, skew $\alpha_n$ and drift $\varphi_n$, $\varepsilon_n$ is a stochastic delay in the direction from master to slave, $\gamma_n$ is a stochastic delay in the direction from slave to master, and $v_n=(\gamma_n-\varepsilon_n)$ is the measurement noise, and the process equation used in the Kalman filtering approach is:

$$X_n = \begin{bmatrix} \theta_n \\ \alpha_n \\ \varphi_n \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \theta_{n-1} \\ \alpha_{n-1} \\ \varphi_{n-1} \end{bmatrix} + \begin{bmatrix} w_{\theta,n} \\ w_{\alpha,n} \\ w_{\varphi,n} \end{bmatrix} = A_n X_{n-1} + w_n,$$

wherein $w_n$ is the process noise vector made up of the process noise in the offset, skew and drift and $\Delta t$ is the time between iterations.

In any of the above embodiments, it may be chosen that $\Delta t=(T_{2,n}-T_{2,n-1})$, which is the time between receipt of consecutive timing messages at the slave.

Preferably the controller is further arranged to synchronize the slave clock to the master clock.

In certain embodiments the controller is further arranged to: determine between a normal condition in which timing messages are being received from the master device and an abnormal condition in which no timing messages have been received from the master device for at least a predetermined time period; and during said normal condition, store information about the behavior of the slave clock, the information including information about the skew and drift of the slave clock compared to the master clock, during said abnormal condition, use said stored information to control the slave clock and to synchronize the slave clock as closely as possible to the master clock.

Thus the estimates of the skew and drift obtained during the normal condition can be used to "steer" the slave clock to stay closely aligned to the master clock when the master clock is temporarily unavailable or the communication path between the master and the slave is temporarily broken. For example in a mobile network, a base station can maintain its own accurate time in order to keep operations running even in the event of temporarily losing connection to the timing master.

By storing information about skew and drift, the effects of random noise in the oscillator, the measurement circuitry and any noise in the external reference as well as any aging and environmental effects such as temperature in the oscillator can be captured.

Preferably the stored information also includes information about the offset of the slave clock compared to the master clock. The stored information about the offset may be a low-pass filtered value of the initial offset.

The timing system of the present aspect may include any combination of some, all or none of the above described preferred and optional features.

Basic Clock Model

To set out embodiments of the present invention, it is first useful to define a generalized clock offset and skew equation for the synchronization problem. Below is some terminology that can be used to describe clock behavior.

Offset: Consider the time server and time client clocks, S and C, respectively. The difference or offset between the time reported by the clock S and the "ideal" or "true" time is $(S(t)-t)$. The offset of the clock S relative to C at time $t\geq 0$ is $\theta(t)=(C(t)-S(t))$; this is called relative offset.

Frequency: This is the rate at which a clock progresses. The frequency at time t of S is $f_s(t)=dS(t)/dt=S'(t)$.

Skew: This is the difference in the frequencies of a clock and the "true" clock. The skew of S relative to C at time $t\geq 0$ is $\alpha(t)=(C'(t)-S'(t))$; this is called relative skew. In this present description the relative offset and relative skew are simply referred to as offset and skew, respectively. In practice, the skew is defined as a fractional quantity, $\alpha(t)=(C'(t)-S'(t))/S'(t)$.

Drift: The drift of clock S is $S''(t)$, that is, the rate of change of its frequency with time. The drift of S relative to C at time $t\geq 0$ is $\varphi(t)=(C''(t)-S''(t))$. Typically, the aging rate or drift rate of an oscillator is defined as the fractional rate of change of frequency per unit of time (e.g., 0.1 ppb per day), which can be expressed (for an observation period $\Delta t$ (e.g., 1 day)) as, $$\varphi(t+\Delta t)=(C'(t+\Delta t)-C'(t))/(\Delta t \cdot S'(t)),$$

which gives results of the form "x ppb per $\Delta t$", or $$\varphi(t+\Delta t)S'(t)=(C'(t+\Delta t)-C'(t)/\Delta t,$$

which gives results of the form "y Hz per $\Delta t$".

Figure 1:
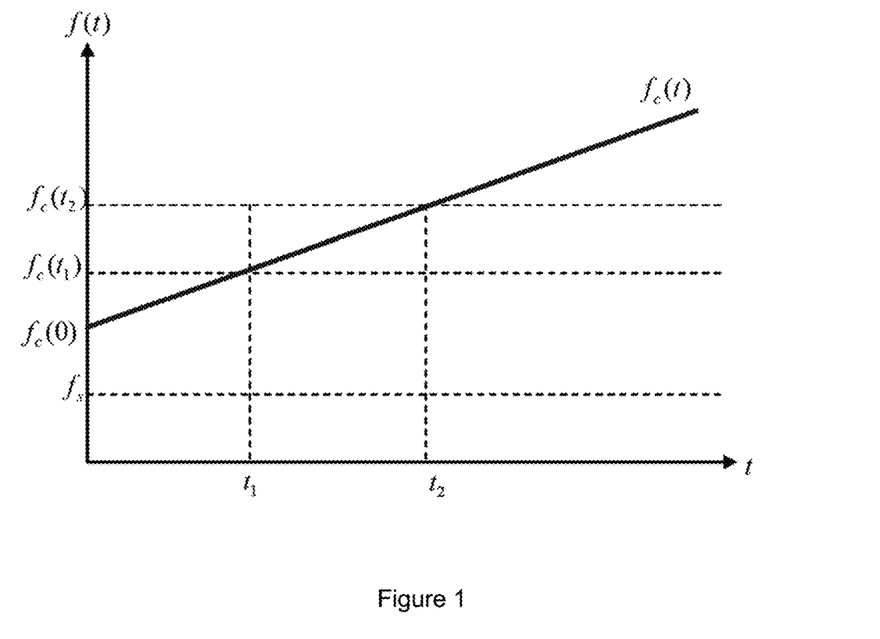
FIG. 1 shows the development of a typical slave oscillator frequency over time.

The frequency of the (stable and accurate) reference source (master or GrandMaster clock) can be denoted as $f_s$, and that of the client (slave) denoted by $f_c(t)$ at time t. Using a simple clock model (e.g. as shown in FIG. 1), the frequency of slave oscillator at any time t can be expressed as $$f_c(t)=f_c(0)+f_s\int_0^t \varphi(x)dx, \qquad (1)$$

where $f_c(0)$ is the initial frequency of the slave oscillator at $t=0$, and $\varphi(t)$ is the drift of the oscillator at time t. It is assumed here that the drift is the fractional rate of change of frequency per unit of time.

In practice, the change in the frequency of an oscillator (FIG. 1) is defined as a fraction of the reference frequency and is expressed as $$\frac{\Delta f_c}{f_s} = \frac{f_c(t_2) - f_c(t_1)}{f_s} \qquad (2)$$

The skew or fractional frequency offset (FFO), $\alpha(t)$, of an oscillator (with respect to the reference) is expressed as $$\alpha(t) = \frac{f_c(t) - f_s}{f_s} \quad (3)$$

Using (1), the skew $\alpha(t)$ and the drift $\varphi(t)$ of an oscillator can be related as follows $$\alpha(t) = \frac{f_c(t) - f_s}{f_s} = \frac{\left(f_c(0) + f_s \int_0^t \varphi(x)dx\right) - f_s}{f_s} = \alpha(0) + \int_0^t \varphi(x)dx \quad (4)$$

where $\alpha(0)$ is the initial skew or FFO of the slave oscillator at t=0. For quartz oscillators, the aging rate is normally stated in terms of a daily fractional frequency deviation. As a well-aged quartz oscillator has a nearly constant aging rate per day, the convention is to express the daily aging rate as if it were constant; e.g., ±0.5 ppb per day.

As any oscillator over a period of time will exhibit a change in its frequency (that is, will have a skew), a clock based on this oscillator will gain or lose time. The clock offset $\theta(t)$ or the time error can be expressed as $$\theta(t) = \theta(0) + \int_0^t \alpha(x)dx = \theta(0) + \alpha(0) \cdot t + \int_0^t \int_0^t \varphi(x)dxdy \quad (5)$$

where $\theta(0)$ is the initial offset of the slave oscillator at t=0. In the case where $\varphi(t)=\varphi$ is constant, the above equation becomes $$\theta(t) = \theta(0) + t\alpha(0) + \tfrac{1}{2}\varphi t^2 \quad (6)$$

Equation (6) indicates that the clock offset or time error $\theta(t)$ over time t depends on the initial time error $\theta(0)$, initial skew $\alpha(0)$, the drift or aging rate $\varphi(t)=\varphi$ (which is usually assumed to be constant over at least a defined period of time, e.g., a day), and the elapsed time t.

Figure 2:
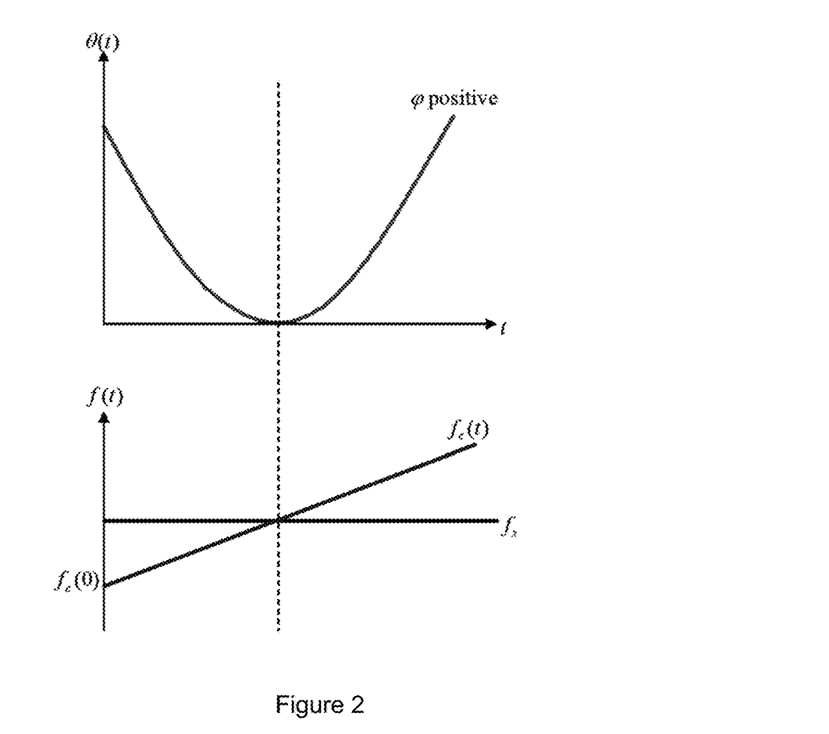
FIG. 2 illustrates the effects of a positive frequency drift on a slave oscillator.

Equation (6) as a function of time is a parabola (as illustrated in FIG. 2) for which the vertical displacement depends on the value of initial offset $\theta(0)$. FIG. 2 assumes a positive drift or aging rate $\varphi$>0. The corresponding frequency plot is shown below the clock offset plot. It can be seen that the oscillator frequency $f_c(t)$ is exactly equal to the reference frequency $f_s$ at the point corresponding to the vertex of the clock offset curve. For a negative drift or aging ($\varphi$<0), the parabola would be inverted.

Given an observation period $\Delta t$, Equation (7) can also be expressed as $$\theta(t+\Delta t) = \theta(t) + \Delta t\alpha(t) + \tfrac{1}{2}\varphi(\Delta t)^2 \quad (7)$$

Figure 3:
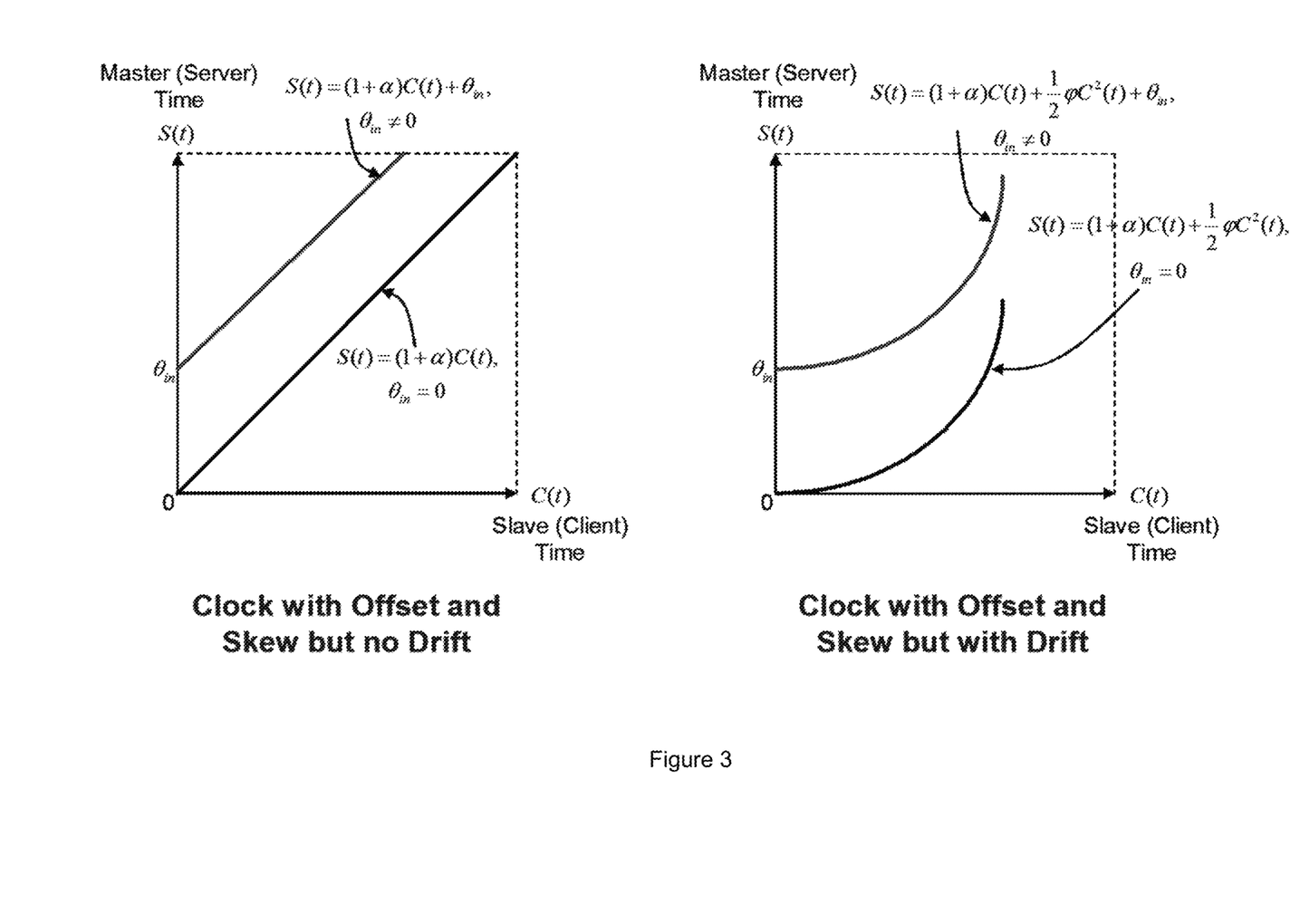
FIG. 3 illustrates the effects of offset, skew and drift on a slave clock model.

Equation (6) above can be extended to describe the relationship between the master (server) and slave (client) clocks. It is assumed that all measurements carried locally at the slave are done using a local free-running clock C(t). It is also assumed that the skew is fairly constant and is given as $\alpha(0)=\alpha(t)=\alpha$. This assumption will be relaxed later on in the Kalman filter analysis. At any particular time instant, the instantaneous view of the relationship between the master (server) clock with timeline S(t) and the slave (client) clock with timeline C(t), can be described by the above clock model, and described by the equation, $$S(t)-C(t)=\theta(t)=\theta_{in}+C(t)\alpha+\tfrac{1}{2}\varphi C^2(t)$$

$$S(t)=C(t)+\theta_{in}+C(t)\alpha+\tfrac{1}{2}\varphi C^2(t)$$

$$S(t)=(1+\alpha)C(t)+\tfrac{1}{2}\varphi C^2(t)+\theta_{in} \quad (8)$$

where $\theta_{in}=\theta(0)$. This snapshot is an instantaneous view of how well the two clocks are (mis)aligned. FIG. 3 illustrates the influence of $\theta$, $\alpha$, and $\varphi$ on the alignment between S(t) and C(t).

The time varying offset S(t)−C(t)=$\theta$(t) in (8) reflects the true offset between the two clocks. This offset consists of three components, the first being $\theta_{in}$ the (fixed) initial offset, the second is $\alpha$C(t) which is an offset that arises as a result of the non-zero skew between the two clocks, and the third is $\varphi C^2(t)/2$ which is due to the drift between the two clocks. Time synchronization in this sense (that is, estimating S(t)) will require knowing accurately the total offset $\theta(t)$ or, equivalently, its constituent components ($\theta_{in}$, $\alpha$ and $\varphi$) when given any C(t) value. A technique for estimating these parameters and the server time S(t) is set out in the embodiments below.

Kalman Filtering Models

In the clock synchronization problem in an embodiment of the present invention, a free running local oscillator (driving a counter) is used at the client (slave). The output of this free-running counter is used together with the estimated clock parameters (offset, skew and drift) to synthesize a synchronized local clock which is an estimated image of the server clock. The frequency of this client's local oscillator is not adjusted, but it is allowed to free-run. This free running counter is used for timestamping and for synthesizing an image of the server clock (synchronized local clock) for the time client. The timestamps indicated in FIG. 4 at the client 3 are with respect to this local free-running clock.

The basic clock model above can be extended to account for the case where the GM/master clock 4 and slave clock 5 exchange PTP messages over a network 2. The communication link between a GM 1 and a slave 3 has a fixed and random delay. The PTP messages pass through a network of one or several devices from GM to slave.

It is assumed the $n^{th}$ Sync message travelling from the GM 1 to the slave 3 experiences a fixed physical link (or propagation) delay of $d_f$ plus variable queuing delay of $r_{f,n}$. Similarly, it is assumed the $n^{th}$ Delay_Req message traveling from the slave 3 to the GM 1 experiences a fixed delay of $d_r$ plus variable queuing delay of $r_{r,n}$.

The GM 1 and slave 3 exchange messages using the delay-request delay-response mechanism illustrated in FIG. 4. For the $n^{th}$ Sync message which departs the GM with timestamp $T_{1,n} \in S(t)$ and arrives at the slave with timestamp $T_{2,n} \in C(t)$ after having experienced delays of $d_f$ and $r_{f,n}$, the clock model above can be extended to account for the travel time to obtain the following expression:

$$(T_{1,n}+d_f+r_{f,n})=(1+\alpha)T_{2,n}+\tfrac{1}{2}\varphi T_{2,n}^2+\theta_{in} \quad (9)$$

For the $n^{th}$ Delay_Req message which departs the slave with timestamp $T_{3,n} \in C(t)$ and arrives at the GM with timestamp $T_{4,n} \in S(t)$ after having experienced delays of $d_r$ and $r_{r,n}$, the following expression can be obtained from the clock model:

$$(T_{4,n}-d_r-r_{r,n})=(1+\alpha)T_{3,n}+\tfrac{1}{2}\varphi T_{3,n}^2+\theta_{in} \quad (10)$$

A key assumption here is that the message exchanges occur over a period of time so small that the total offset $\theta$ (omitting here the time index t or n) and skew $\alpha$ can be assumed constant over that period. Below a Kalman filter based technique for computing the offsets $\theta$, $\theta_{in}$, $\alpha$, and $\varphi$ using the Sync and Delay_Req message exchanges described in FIG. 4 is set out. At any given discrete time n, the estimated skew α, drift φ, and offset $\theta_{in}$ can be used to estimate the server time $S_n$ corresponding to a local clock value $C_n$.

Kalman Filter Basics

The Kalman filter [2] allows measurements of a process observed over time, containing noise and other inaccuracies, to be used to produce values (estimates) that tend to be closer to the true values of the measurements and their associated calculated values. The Kalman filter produces estimates of the true values of measurements and their associated calculated values by predicting a value, estimating the uncertainty of the predicted value, and computing a weighted average of the predicted value and the measured value.

In order to use the Kalman filter to estimate the internal state of a process given only a sequence of noisy observations, the process should be modelled in accordance with the framework of the Kalman filter. Consider a state-space model described by the following pair of equations State Equation: $X_n = A_n X_{n-1} + w_n$, (11)

Measurement Equation: $y_n = D_n X_n + v_n$, (12)

where n is a nonnegative time index, $A_n$ is a known M-by-M state transition matrix, $X_n$ is the M-dimensional state (or parameter) vector, $w_n$ is an M-dimensional process noise vector which is assumed to be drawn from a zero mean multivariate normal distribution with covariance $Q_n = E[w_n w_n^T]$, $w_n \sim N(0, Q_n)$, $y_n$ is the measurement, $D_n$ is a known 1×M-dimensional measurement matrix which maps the true state space into the measurement space, $v_n$ is the measurement noise which is assumed to be zero mean Gaussian white noise with covariance $R_n = E[v_n v_n^T]$, $v_n \sim N(0, R_n)$, and T denotes transpose. It is assumed in the model that the initial state, and the noise vectors at each step $\{X_0, w_1, \ldots, w_n, v_1, \ldots, v_n\}$ are mutually independent.

The notation $\hat{X}_{n,m}$, used below represents the estimate of X at time n given observations up to, and including at time m. The Kalman filter equations are most often conceptualized as two distinct phases: Predict and Update as described below.

Predict Phase:

The predict phase uses the state estimate from the previous time step to produce an estimate of the state at the current time step.

Predicted (a priori) state estimate:

$\hat{X}_{n,n-1} = A_n \hat{X}_{n-1,n-1}$ (13)

This predicted state estimate is also known as the a priori state estimate because, although it is an estimate of the state at the current time step, it does not include observation information from the current time step.

Predicted (a priori) estimate covariance:

$P_{n,n-1} = A_n P_{n-1,n-1} A_n^T + Q_n$ (14)

Update Phase:

In the update phase, the current a priori prediction is combined with current observation information to refine the state estimate. This improved estimate is termed the a posteriori state estimate.

Innovation or measurement residual:

$\tilde{z}_n = y_n - D_n \hat{X}_{n,n-1}$ (15)

Innovation (or residual) covariance:

$S_n = D_n P_{n,n-1} D_n^T + R_n$ (16)

Optimal Kalman gain:

$K_n = P_{n,n-1} D_n^T S_n^{-1} = P_{n,n-1} D_n^T [D_n P_{n,n-1} D_n^T + R_n]^{-1}$ (17)

Updated (a posteriori) state estimate:

$\hat{X}_{n,n} = \hat{X}_{n,n-1} + K_n \tilde{z}_n = \hat{X}_{n,n-1} + K_n (y_n - D_n \hat{X}_{n,n-1})$ (18)

This is the a posteriori state estimate at time n given observations up to and including at time n. The second term in the above equation is called the correction term and it represents the amount by which to correct the propagated state estimate due to the measurement. Inspection of the Kalman gain equation shows that if the measurement noise is large, $R_n$ will be large, so that $K_n$ will be small and we would not give much credibility to the measurement y when computing the next $\hat{X}$. On the other hand, if the measurement noise is small, $R_n$ will be small, so that $K_n$ will be large and we will give a lot of credibility to the measurement when computing the next $\hat{X}$.

Updated (a posteriori) estimate covariance:

$P_{n,n} = (I - K_n D_n) P_{n,n-1}$ (19)

This is the a posteriori error covariance matrix (a measure of the estimated accuracy of the state estimate).

Typically, the two phases alternate, with the prediction advancing the state until the next scheduled observation, and the update incorporating the observation. Practical implementation of the Kalman Filter generally requires getting a good estimate of the noise covariance matrices $Q_n$ and $R_n$.

Development of Measurement (Observation) Model

In this section models which can be used with a Kalman filter based technique to estimate the clock offset and skew are explained. Assume a Sync message travelling from a GM 1 to the slave 3 experiences a fixed delay d, variable queuing delay $r_f$, plus a stochastic delay ε (to account for all other delay components in the system). Similarly, it is assumed that a Delay_Req message leaving the slave 3 to the GM 1 experiences a fixed delay of d, variable queuing delay $r_{r,n}$, and a variable stochastic delay γ.

Assume, for the moment, that the fixed delay components in both directions are equal, $d_f = d_r = d$ (symmetric communication paths) but the messages experience variable queuing delay. The variables $\theta_n$, $\alpha_n$ and $\varphi_n$ are, respectively, the estimates of the total offset, skew and drift during the nth Sync message exchange. Equations (9) and (10) can be rewritten to account for the above conditions with the following equations $(T_{1,n} + d + r_{f,n} + \varepsilon_n) = (1 + \alpha_n) T_{2,n} + \frac{1}{2} \varphi T_{2,n}^2 + \theta_{in}$ (20)

$(T_{4,n} - d - r_{r,n} - \gamma_n) = (1 + \alpha_n) T_{3,n} + \frac{1}{2} \varphi T_{3,n}^2 + \theta_{in}$ (21)

It can be seen from (8) that for a given reading of $C_n$, the total offset is $\theta_n = \alpha_n C_n + (\varphi C_n^2)/2 + \theta_{in}$. An important assumption here is the total offset $\theta_n$ stays constant between Sync message exchanges as stated earlier above. With this and assuming further that the $T_{2,n} \in C(t)$ and $T_{3,n} \in C(t)$ timestamps are captured closer together within any two Sync message exchanges, the total offset $\theta_n$ in that interval can be defined as:

$\theta_n = \alpha_n T_{2,n} + \frac{1}{2} \varphi T_{2,n}^2 + \theta_{in} \approx \alpha_n T_{3,n} + \frac{1}{2} \varphi T_{3,n}^2 + \theta_{in}$ (22)

With the above definitions in mind, $(T_{1,n} + d + r_{f,n} + \varepsilon_n) = T_{2,n} + \theta_1$ (23)

$(T_{4,n} - d - r_{r,n} - \gamma_n) = T_{3,n} + \theta_n$ (24)

Adding (23) and (24) obtains the measurement equation as $$(T_{1,n}+T_{4,n})+(r_{f,n}-r_{r,n})+(\varepsilon_n-\gamma_n)=(T_{2,n}+T_{3,n})+2\theta_n$$

$$(T_{1,n}-T_{2,n})+(T_{4,n}-T_{3,n})+(r_{f,n}-r_{r,n})=2\theta_n+(\gamma_n-\varepsilon_n) \quad (25)$$

The measurement equation above can be rewritten as $$\underbrace{(T_{1,n}-T_{2,n})+(T_{4,n}-T_{3,n})+(r_{f,n}-r_{r,n})}_{y_n}=\underbrace{2\theta_n}_{D_n X_n}+\underbrace{(\gamma_n-\varepsilon_n)}_{v_n} \quad (26)$$

where
n is a nonnegative time index,
$y_n=(T_{1,n}-T_{2,n})+(T_{4,n}-T_{3,n})+(r_{f,n}-r_{r,n})$ is a scalar,
$D_n=[2\ 0\ 0]$ is a 1×3 matrix,
$X_n^T=[\theta_n\ \alpha_n\ \varphi_n]$ is a 3×1 matrix, and
$v_n=(\gamma_n-\varepsilon_n)$ is the measurement noise.

Alternatively, in the case where the forward delay $d_f$ and reverse delay $d_r$ are unequal but are known (see equations (9) and (10)), the measurement equation can be obtained as $$\underbrace{(T_{1,n}-T_{2,n})+(T_{4,n}-T_{3,n})+(d_f-d_r)+(r_{f,n}-r_{r,n})}_{y_n}= \quad (27)$$

$$\underbrace{2\theta_n}_{D_n X_n}+\underbrace{(\gamma_n-\varepsilon_n)}_{v_n}$$

where $y_n=(T_{1,n}-T_{2,n})+(T_{4,n}-T_{3,n})+(d_f-d_r)+(r_{f,n}-r_{r,n})$ is a scalar. The quantity $(d_f-d_r)$ accounts for the fixed delay asymmetry in the system. The above more general equation allows for known delays and asymmetries to be accounted for in the Kalman Filter formulation. The $n^{th}$ sampling interval is considered to be the period in which the $n^{th}$ Sync and $n^{th}$ Delay_Req messages exchanges occur.

Developing the State (Process) Equation Clock Process Model

Next the slave clock (process) model parameters $A_n$ and $w_n$ are derived. From (7), the process dynamics for the clock in discrete time while accounting for process noise can be expressed as:

$$\theta_n=\theta_{n-1}+\Delta\Delta t\cdot\alpha_{n-1}+\tfrac{1}{2}\varphi_{n-1}\cdot(\Delta t)^2+w_{\theta,n} \quad (28)$$

$$\alpha_n=\alpha_{n-1}+\varphi_{n-1}\cdot\Delta t+w_{\alpha,n} \quad (29)$$

$$\varphi_n\varphi_{n-1}+w_{\varphi,n} \quad (30)$$

where $w_n^T=[w_{\theta,n}\ w_{\alpha,n}\ w_{\varphi,n}]$ is the process noise vector which is assumed to be drawn from a zero mean normal distribution with covariance $Q_n=E[w_n w_n^T]$. The system can be described by the following three-state dynamic model $$X_n=\begin{bmatrix}\theta_n\\\alpha_n\\\varphi_n\end{bmatrix}=\begin{bmatrix}1 & \Delta t & (\Delta t)^2/2\\0 & 1 & \Delta t\\0 & 0 & 1\end{bmatrix}\begin{bmatrix}\theta_{n-1}\\\alpha_{n-1}\\\varphi_{n-1}\end{bmatrix}+\begin{bmatrix}w_{\theta,n}\\w_{\alpha,n}\\w_{\varphi,n}\end{bmatrix}=A_n X_{n-1}+w_n, \quad (31)$$

where $A_n$ is the known 3-by-3 state transition matrix. If the time between Sync messages is fixed as would be the case when a constant Sync departure rate is configured at the GM, $\Delta t=(T_{1,n}-T_{1,n-1})$ is a constant term. If measurements are done according to the local clock then $\Delta t=(T_{2,n}-T_{2,n-1})$ would be variable, i.e., $\Delta t_n=(T_{2,n}-T_{2,n-1})$. In reality, $A_n$ is not a fixed matrix because of the variable message delays experienced in the system, thus making $\Delta t_n=(T_{2,n}-T_{2,n-1})$ the most appropriate expression to be used in the A matrix in (31) at each iteration.

To achieve time synchronization or equivalently find the server time estimate $(S_n+C_n+\theta_n)$, the estimate $\theta_n$ from the Kalman Filter can be used.

Clock Steering During Holdover Using Clock Skew and Drift

The goal in relation to holdover is to provide a mechanism that characterizes the oscillator behavior and the output used to enhance clock performance should the reference source become temporarily unavailable. The algorithm learns an oscillator's behavior during normal system operation (when reference is available) and controls the oscillator frequency when the reference is lost. However, the long-term clock accuracy provided in holdover is dependent primarily on the quality of the oscillator being controlled.

How the Holdover Mechanism Works

Figure 5:
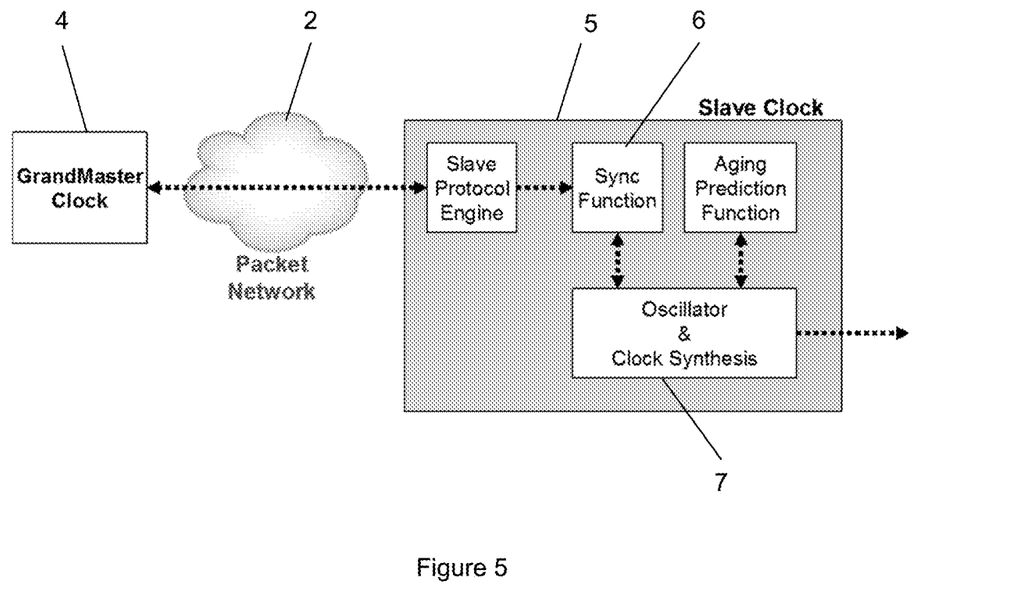
FIG. 5 shows a timing system and slave device according to an embodiment of the present invention.

FIG. 5 shows an arrangement of a slave clock 5 with a holdover mechanism in accordance with an embodiment of the present invention. The system monitors the skew and drift of the oscillator while it is synchronized to the external reference (Grandmaster clock 4). This gives a measure of the skew and drift between the internal oscillator, if it is free-running, and the external reference over time. The resulting measurements include the effects of random noise in the oscillator, the measurement circuitry, and any noise in the external reference as well as any aging and environmental effects such as temperature in the oscillator. Long-term changes, those occurring over a period of many hours, are related to the aging of the internal oscillator. Frequency changes also occur as a function of temperature, which is measured by the system.

From this information (offset, skew and drift), the system makes a continuous prediction of clock time over time if the external reference becomes unavailable. The algorithm as described above (Sync Function 6) "learns" the basic behavior of the oscillator as it operates and is supplied by signals from the reference source. During the loss of the reference, the clock synthesis function 7 uses data learned previously about the oscillator to control the oscillator and attempts to maintain all timing outputs at essentially the same level of precision as that obtained while locked to the reference. This form of operation is called holdover. Actual performance is highly dependent on the overall length of learning time available before holdover. The longer the learning period, and the more stable the oscillator, the more accurate the prediction.

The Holdover Mechanism

Equation (8) can be expressed in discrete time as $$S_n-C_n=\theta_n=\theta_{in}+\alpha_n C_n+\tfrac{1}{2}\varphi_n C_n^2, \quad (32)$$

from which the initial offset can be obtained as $$\theta_{in}=\theta_n-\alpha_n C_n-\tfrac{1}{2}\varphi_n C_n^2 \quad (33)$$

During normal operations (where there is a reference) $\theta_{in}$ can be estimated as in (33) and a low-pass filtered value of $\theta_{in}$ can be maintained and stored ($\hat\theta_{in}$). Then during holdover (when the reference is lost), the system can use the $\hat\theta_{in}$, $\alpha_n$, and $\varphi_n$ values obtained immediately before holdover (denoted as $\theta_{ho,in}$, $\alpha_{ho,n}$ and $\varphi_{ho,n}$), plus the current free-running local counter value $C_n$, to estimate $S_n$ as follows:

$$S_n=(1+\alpha_{ho,n})C_n+\tfrac{1}{2}\varphi_{ho,n}C_n^2+\theta_{ho,in} \quad (34)$$

It is assumed here that the system incorporates already appropriate mechanisms for detecting the loss of signals from the reference source (e.g., stoppage of PTP message flows over a configured period of time, etc.)

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. IEEE Standard for a Precision Clock Synchronization Protocol for Networked Measurement and Control Systems, IEEE 1588-2008.
[2]. R. E. Kalman, "A New Approach to Linear Filtering and Prediction Problems," *Transaction of the ASME—Journal of Basic Engineering*, March 1960, pp. 35-45.

All references referred to above are hereby incorporated by reference.

In exemplary embodiments, the estimated offset of the slave clock compared to the master clock, the estimated skew of the slave clock compared to the master clock, and the estimated drift of the slave clock compared to the master clock are transmitted to another computer system and stored on a computer readable media. In exemplary embodiments, a computer system (e.g., the computer system with the slave clock, the computer system with the master clock, and/or the other computer system) calculates a corrective slave offset value using at least the estimated offset of the slave clock compared to the master clock and, if necessary, transmits the corrective slave offset value to the computer having the slave clock, and the computer system with the slave clock stores the corrective slave offset value in a computer readable media and applies the corrective slave offset value to the slave clock for corrected future timing messages. In exemplary embodiments, a computer system (e.g., the computer system with the slave clock, the computer system with the master clock, and/or the other computer system) calculates a corrective slave skew value using at least the estimated skew of the slave clock compared to the master clock and, if necessary, transmits the corrective slave skew value to the computer having the slave clock, and the computer system with the slave clock stores the corrective slave skew value in a computer readable media and applies the corrective slave skew value to the slave clock for corrected future timing messages. In exemplary embodiments, a computer system (e.g., the computer system with the slave clock, the computer system with the master clock, and/or the other computer system) calculates a corrective slave drift value using at least the estimated drift of the slave clock compared to the master clock and, if necessary, transmits the corrective slave drift value to the computer having the slave clock, and the computer system with the slave clock stores the corrective slave drift value in a computer readable media and applies the corrective slave drift value to the slave clock for corrected future timing messages.

The invention claimed is:

1. A method of estimating the offset, skew and drift of a slave clock in a slave device compared to a master clock in a master device, the method including the steps of:
    exchanging timing messages between the master device and the slave device and recording the times of sending and receiving said messages; and
    estimating the offset, skew and drift of the slave clock compared to the master clock from said recorded times; and
    wherein the step of estimating involves using a Kalman filtering approach in which a measurement equation contains a term relating to the offset of the slave clock at the time of measurement and a process equation contains terms relating to the offset, skew and drift of the slave clock at both the current time and the time of the previous measurement.

2. The method according to claim 1 wherein the measurement equation used in the Kalman filtering approach is:

$$\frac{(T_{1,n} - T_{2,n}) + (T_{4,n} - T_{3,n}) + (r_{f,n} - r_{r,n})}{y_n} = \frac{2\theta_n}{D_n x_n} + \frac{(\gamma_n - \varepsilon_n)}{v_n}$$

wherein n is a nonnegative time index, $\theta_n$ is the estimated offset at time n, $T_{1,n}$ is the time of sending of a first timing message from the master device to the slave device according to the master clock, $T_{2,n}$ is the time of receipt of the first timing message according to the slave clock, $T_{3,n}$ is the time of sending of a second timing message from the slave device to the master device according to the slave clock, $T_{4,n}$ is the time of receipt of the second timing message according to the master clock, $d_f$ is the fixed delay between the master device and the slave device, $d_r$ is the fixed delay between the slave device and the master device, $r_{f,n}$ is the variable queuing delay between the master device and the slave device, $r_{r,n}$ is the variable queuing delay between the slave device and the master device, $D_n=[2\ 0\ 0]$ is a 1×3 matrix, $X_n^T=[\theta_n\ \alpha_n\ \varphi_n]$ is a 3×1 matrix of the estimated offset, skew $\alpha_n$ and drift $\varphi_n$, $\varepsilon_n$ is a stochastic delay in the direction from the master device to the slave device, $\gamma_n$ is a stochastic delay in the direction from the slave device to the master device, and $v_n=(\gamma_n-\varepsilon_n)$ is the measurement noise, and the process equation used in the Kalman filtering approach is:

$$X_n = \begin{bmatrix} \theta_n \\ \alpha_n \\ \varphi_n \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \theta_{n-1} \\ \alpha_{n-1} \\ \varphi_{n-1} \end{bmatrix} + \begin{bmatrix} w_{\theta,n} \\ w_{\alpha,n} \\ w_{\varphi,n} \end{bmatrix} = A_n X_{n-1} + w_n,$$

wherein $w_n$ is the process noise vector made up of the process noise in the offset, skew and drift and $\Delta t$ is the time between iterations.

3. The method according to claim 2 wherein $\Delta t = (T_{2,n} - T_{2,n-1})$, which is the time between receipt of consecutive timing messages at the slave device.

4. The method according to claim 1 wherein the measurement equation used in the Kalman filtering approach is:

$$\underbrace{(T_{1,n} - T_{2,n}) + (T_{4,n} - T_{3,n}) + (d_f - d_r) + (r_{f,n} - r_{r,n})}_{y_n} = \underbrace{2\theta_n}_{D_n X_n} + \underbrace{(\gamma_n - \varepsilon_n)}_{v_n}$$

wherein n is a nonnegative time index, $\theta_n$ is the estimated offset at time n, $T_{1,n}$ is the time of sending of a first timing message from the master device to the slave device according to the master clock, $T_{2,n}$ is the time of receipt of the first timing message according to the slave clock, $T_{3,n}$ is the time of sending of a second timing message from the slave device to the master device according to the slave clock, $T_{4,n}$ is the time of receipt of the second timing message according to the master clock, $d_f$ is the fixed delay between the master device and the slave device, $d_r$ is the fixed delay between the slave device and the master device, $r_{f,n}$ is the variable queuing delay between the master device and the slave device, $r_{r,n}$ is the variable queuing delay between the slave device and the master device, $D_n=[2\ 0\ 0]$ is a 1×3 matrix, $X_n^T=[\theta_n\ \alpha_n\ \varphi_n]$ is a 3×1 matrix of the estimated offset, skew $\alpha_n$ and drift $\varphi_n$, $\varepsilon_n$ is a stochastic delay in the direction from the master device to the slave device, $\gamma_n$ is a stochastic delay in the direction from the slave device to the master device, and $v_n=(\gamma_n-\varepsilon_n)$ is the measurement noise, and the process equation used in the Kalman filtering approach is:

$$X_n = \begin{bmatrix} \theta_n \\ \alpha_n \\ \varphi_n \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \theta_{n-1} \\ \alpha_{n-1} \\ \varphi_{n-1} \end{bmatrix} + \begin{bmatrix} w_{\theta,n} \\ w_{\alpha,n} \\ w_{\varphi,n} \end{bmatrix} = A_n X_{n-1} + w_n,$$

wherein $w_n$ is the process noise vector made up of the process noise in the offset, skew and drift and $\Delta t$ is the time between iterations.

5. The method according to claim 4 wherein $\Delta t = (T_{2,n} - T_{2,n-1})$, which is the time between receipt of consecutive timing messages at the slave device.

6. The method according to claim 1, further including the step of synchronizing the slave clock to the master clock at least based on the estimated drift.

7. The method according to claim 1, further including the steps of:
determining, in the slave device, between a normal condition in which timing messages are being received from the master device and an abnormal condition in which no timing messages have been received from the master device for at least a predetermined time period; and
during said normal condition, storing information about the behavior of the slave clock, the information including information about the skew and drift of the slave clock compared to the master clock,
during said abnormal condition, using said stored information to control the slave clock and to essentially synchronize the slave clock to the master clock.

8. The method according to claim 7 wherein the stored information includes information about the offset of the slave clock compared to the master clock.

9. A slave device connected to a master device over a network, the slave device having:
a slave clock; and
a controller, wherein:
the slave device is arranged to exchange timing messages with the master device and to record the times of sending and receiving said messages and to receive times of sending and receiving said messages from the master device; and
the controller is arranged to estimate the offset, skew and drift of the slave clock compared to a master clock in said master device from said recorded times; and
wherein the controller is arranged to estimate the offset, skew and drift of the slave clock using a Kalman filtering approach in which a measurement equation contains a term relating to the offset of the slave clock at the time of measurement and a process equation contains terms relating to the offset, skew and drift of the slave clock at both the current time and the time of the previous measurement.

10. The slave device according to claim 9 wherein the measurement equation used in the Kalman filtering approach is:

$$\underbrace{(T_{1,n} - T_{2,n}) + (T_{4,n} - T_{3,n}) + (r_{f,n} - r_{r,n})}_{y_n} = \underbrace{2\theta_n}_{D_n X_n} + \underbrace{(\gamma_n - \varepsilon_n)}_{v_n}$$

wherein n is a nonnegative time index, $\theta_n$ is the estimated offset at time n, $T_{1,n}$ is the time of sending of a first timing message from the master device to the slave device according to the master clock, $T_{2,n}$ is the time of receipt of the first timing message according to the slave clock, $T_{3,n}$ is the time of sending of a second timing message from the slave device to the master device according to the slave clock, $T_{4,n}$ is the time of receipt of the second timing message according to the master clock, $d_f$ is the fixed delay between the master device and the slave device, $d_r$ is the fixed delay between the slave device and the master device, $r_{f,n}$ is the variable queuing delay between the master device and the slave device, $r_{r,n}$ is the variable queuing delay between the slave device and the master device, $D_n=[2\ 0\ 0]$ is a 1×3 matrix, $X_n^T=[\theta_n\ \alpha_n\ \varphi_n]$ is a 3×1 matrix of the estimated offset, skew $\alpha_n$ and drift $\varphi_n$, $\varepsilon_n$ is a stochastic delay in the direction from the master device to the slave device, $\gamma_n$ is a stochastic delay in the direction from the slave device to the master device, and $v_n=(\gamma_n-\varepsilon_n)$ is the measurement noise, and the process equation used in the Kalman filtering approach is:

$$X_n = \begin{bmatrix} \theta_n \\ \alpha_n \\ \varphi_n \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \theta_{n-1} \\ \alpha_{n-1} \\ \varphi_{n-1} \end{bmatrix} + \begin{bmatrix} w_{\theta,n} \\ w_{\alpha,n} \\ w_{\varphi,n} \end{bmatrix} = A_n X_{n-1} + w_n,$$

wherein $w_n$ is the process noise vector made up of the process noise in the offset, skew and drift and $\Delta t$ is the time between iterations.

11. The slave device according to claim 10 wherein $\Delta t=(T_{2,n}-T_{2,n-1})$, which is the time between receipt of consecutive timing messages at the slave device.

12. The slave device according to claim 9 wherein the measurement equation used in the Kalman filtering approach is:

$$\underbrace{\frac{(T_{1,n}-T_{2,n})+(T_{4,n}-T_{3,n})+(d_f-d_r)+(r_{f,n}-r_{r,n})}{y_n}} = \underbrace{\frac{2\theta_n}{D_n X_n}} + \underbrace{\frac{(\gamma_n-\varepsilon_n)}{v_n}}$$

wherein n is a nonnegative time index, $\theta_n$ is the estimated offset at time n, $T_{1,n}$ is the time of sending of a first timing message from the master device to the slave device according to the master clock, $T_{2,n}$ is the time of receipt of the first timing message according to the slave clock, $T_{3,n}$ is the time of sending of a second timing message from the slave device to the master device according to the slave clock, $T_{4,n}$ is the time of receipt of the second timing message according to the master clock, $d_f$ is the fixed delay between the master device and the slave device, $d_r$ is the fixed delay between the slave device and the master device, $r_{f,n}$ is the variable queuing delay between the master device and the slave device, $r_{r,n}$ is the variable queuing delay between the slave device and the master device, $D_n=[2\ 0\ 0]$ is a 1×3 matrix, $X_n^T=[\theta_n\ \alpha_n\ \varphi_n]$ is a 3×1 matrix of the estimated offset, skew $\alpha_n$ and drift $\varphi_n$, $\varepsilon_n$ is a stochastic delay in the direction from the master device to the slave device, $\gamma_n$ is a stochastic delay in the direction from the slave device to the master device, and $v_n=(\gamma_n-\varepsilon_n)$ is the measurement noise, and the process equation used in the Kalman filtering approach is:

$$X_n = \begin{bmatrix} \theta_n \\ \alpha_n \\ \varphi_n \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \theta_{n-1} \\ \alpha_{n-1} \\ \varphi_{n-1} \end{bmatrix} + \begin{bmatrix} w_{\theta,n} \\ w_{\alpha,n} \\ w_{\varphi,n} \end{bmatrix} = A_n X_{n-1} + w_n,$$

wherein $w_n$ is the process noise vector made up of the process noise in the offset, skew and drift and $\Delta t$ is the time between iterations.

13. The slave device according to claim 12 wherein $\Delta t=(T_{2,n}-T_{2,n-1})$, which is the time between receipt of consecutive timing messages at the slave device.

14. The slave device according to claim 9, wherein the controller is further arranged to synchronize the slave clock to the master clock at least based on the estimated drift.

15. The slave device according to claim 9, wherein the controller is further arranged to:
    determine between a normal condition in which timing messages are being received from the master device and an abnormal condition in which no timing messages have been received from the master device for at least a predetermined time period; and
    during said normal condition, store information about the behavior of the slave clock, the information including information about the skew and drift of the slave clock compared to the master clock,
    during said abnormal condition, use said stored information to control the slave clock and to essentially synchronize the slave clock to the master clock.

16. The slave device according to claim 15 wherein the stored information includes information about the offset of the slave clock compared to the master clock.

17. A timing system including a master device and a slave device connected over a network, the master device having a master clock and the slave device having:
    a slave clock; and
    a controller, wherein:
    the slave device and master device are arranged to exchange timing messages with each other and to record the times of sending and receiving said messages;
    the master device is arranged to send the times of sending and receiving said messages to the master device; and
    the controller is arranged to estimate the offset, skew and drift of the slave clock compared to a master clock in said master device from said recorded times; and
    wherein the controller is arranged to estimate the offset, skew and drift of the slave clock using a Kalman filtering approach in which a measurement equation contains a term relating to the offset of the slave clock at the time of measurement and a process equation contains terms relating to the offset, skew and drift of the slave clock at both the current time and the time of the previous measurement.

18. The system according to claim 17 wherein the measurement equation used in the Kalman filtering approach is:

$$\underbrace{\frac{(T_{1,n}-T_{2,n})+(T_{4,n}-T_{3,n})+(r_{f,n}-r_{r,n})}{y_n}} = \underbrace{\frac{2\theta_n}{D_n X_n}} + \underbrace{\frac{(\gamma_n-\varepsilon_n)}{v_n}}$$

wherein n is a nonnegative time index, $\theta_n$ is the estimated offset at time n, $T_{1,n}$ is the time of sending of a first timing message from the master device to the slave device according to the master clock, $T_{2,n}$ is the time of receipt of the first timing message according to the slave clock, $T_{3,n}$ is the time of sending of a second timing message from the slave device to the master device according to the slave clock, $T_{4,n}$ is the time of receipt of the second timing message according to the master clock, $d_f$ is the fixed delay between the master device and the slave device, $d_r$ is the fixed delay between the slave device and the master device, $r_{f,n}$ is the variable queuing delay between the master device and the slave device, $r_{r,n}$ is the variable queuing delay between the slave device and the master device, $D_n=[2\ 0\ 0]$ is a 1×3 matrix, $X_n^T=[\theta_n\ \alpha_n\ \varphi_n]$ is a 3×1 matrix of the estimated offset, skew $\alpha_n$ and drift $\varphi_n$, $\varepsilon_n$ is a stochastic delay in the direction from the master device to the slave device, $\gamma_n$ is a stochastic delay in the direction from the slave device to the master device, and $v_n=(\gamma_n-\varepsilon_n)$ is the measurement noise, and the process equation used in the Kalman filtering approach is:

$$X_n = \begin{bmatrix} \theta_n \\ \alpha_n \\ \varphi_n \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \theta_{n-1} \\ \alpha_{n-1} \\ \varphi_{n-1} \end{bmatrix} + \begin{bmatrix} w_{\theta,n} \\ w_{\alpha,n} \\ w_{\varphi,n} \end{bmatrix} = A_n X_{n-1} + w_n,$$

wherein $w_n$ is the process noise vector made up of the process noise in the offset, skew and drift and $\Delta t$ is the time between iterations.

19. The system according to claim 18 wherein $\Delta t=(T_{2,n}-T_{2,n1})$, which is the time between receipt of consecutive timing messages at the slave device.

20. The system according to claim 17 wherein the measurement equation used in the Kalman filtering approach is:

$$\underbrace{\frac{(T_{1,n}-T_{2,n})+(T_{4,n}-T_{3,n})+(d_f-d_r)+(r_{f,n}-r_{r,n})}{y_n}} = \underbrace{\frac{2\theta_n}{D_n X_n}} + \underbrace{\frac{(\gamma_n-\varepsilon_n)}{v_n}}$$

wherein n is a nonnegative time index, $\theta_n$ is the estimated offset at time n, $T_{1,n}$ is the time of sending of a first timing message from the master device to the slave device according to the master clock, $T_{2,n}$ is the time of receipt of the first timing message according to the slave clock, $T_{3,n}$ is the time of sending of a second timing message from the slave device to the master device according to the slave clock, $T_{4,n}$ is the time of receipt of the second timing message according to the master clock, $d_f$ is the fixed delay between the master device and the slave device, $d_r$ is the fixed delay between the slave device and the master device, $r_{f,n}$ is the variable queuing delay between the master device and the slave device, $r_{r,n}$ is the variable queuing delay between the slave device and the master device, $D_n=[2\ 0\ 0]$ is a 1×3 matrix, $X_n^T=[\theta_n\ \alpha_n\ \varphi_n]$ is a 3×1 matrix of the estimated offset, skew $\alpha_n$ and drift $\varphi_n$, $\varepsilon_n$ is a stochastic delay in the direction from the master device to the slave device, $\gamma_n$ is a stochastic delay in the direction from the slave device to the master device, and $v_n=(\gamma_n-\varepsilon_n)$ is the measurement noise, and the process equation used in the Kalman filtering approach is:

$$X_n = \begin{bmatrix} \theta_n \\ \alpha_n \\ \varphi_n \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \theta_{n-1} \\ \alpha_{n-1} \\ \varphi_{n-1} \end{bmatrix} + \begin{bmatrix} w_{\theta,n} \\ w_{\alpha,n} \\ w_{\varphi,n} \end{bmatrix} = A_n X_{n-1} + w_n,$$

wherein $w_n$ is the process noise vector made up of the process noise in the offset, skew and drift and $\Delta t$ is the time between iterations.

21. The system according to claim 20 wherein $\Delta t=(T_{2,n}-T_{2,n-1})$, which is the time between receipt of consecutive timing messages at the slave device.

22. The system according to claim 17, wherein the controller is further arranged to synchronize the slave clock to the master clock at least based on the estimated drift.

23. The system according to claim 17, wherein the controller is further arranged to:
- determine between a normal condition in which timing messages are being received from the master device and an abnormal condition in which no timing messages have been received from the master device for at least a predetermined time period; and
- during said normal condition, store information about the behavior of the slave clock, the information including information about the skew and drift of the slave clock compared to the master clock,
- during said abnormal condition, use said stored information to control the slave clock and to essentially synchronize the slave clock to the master clock.

24. The system according to claim 23 wherein the stored information includes information about the offset of the slave clock compared to the master clock.

* * * * *